United States Patent
Wasilewski et al.

(10) Patent No.: US 10,151,436 B1
(45) Date of Patent: Dec. 11, 2018

(54) VEHICLE LIGHTING ASSEMBLY WITH LIGHT TRANSFER OPTICAL SYSTEM

(71) Applicant: GM Global Technology Operations LLC, Detroit, MI (US)

(72) Inventors: Andrzej Wasilewski, Shelby Township, MI (US); Jeffrey T. Zawacki, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/782,379

(22) Filed: Oct. 12, 2017

(51) Int. Cl.

| | |
|---|---|
| *F21S 41/141* | (2018.01) |
| *F21S 41/55* | (2018.01) |
| *F21S 41/32* | (2018.01) |
| *F21S 41/24* | (2018.01) |
| *F21S 43/243* | (2018.01) |
| *B60Q 1/18* | (2006.01) |
| *F21S 43/40* | (2018.01) |
| *F21S 45/10* | (2018.01) |
| *F21S 41/148* | (2018.01) |
| *F21S 41/151* | (2018.01) |

(52) U.S. Cl.
CPC .............. *F21S 41/141* (2018.01); *B60Q 1/18* (2013.01); *F21S 41/24* (2018.01); *F21S 41/32* (2018.01); *F21S 41/55* (2018.01); *F21S 43/243* (2018.01); *F21S 43/40* (2018.01); *F21S 45/10* (2018.01); *F21S 41/148* (2018.01); *F21S 41/151* (2018.01)

(58) Field of Classification Search
CPC ...... F21S 41/141; F21S 41/147; F21S 41/148; F21S 41/151; F21S 41/24; F21S 43/14; F21S 43/15; F21S 43/251; F21S 43/243; G02B 6/0008
See application file for complete search history.

(56) References Cited

U.S. PATENT DOCUMENTS

| | | | | |
|---|---|---|---|---|
| 7,946,743 | B2 * | 5/2011 | Natsume | B60Q 1/0041 362/509 |
| 2010/0202153 | A1 * | 8/2010 | Schwab | B60Q 1/0041 362/520 |
| 2010/0254152 | A1 * | 10/2010 | Taleb-Bendiab | B60Q 1/0035 362/551 |
| 2011/0228549 | A1 * | 9/2011 | Lindsay | G02B 6/0006 362/555 |
| 2012/0069592 | A1 * | 3/2012 | Natsume | B60Q 1/0052 362/511 |

(Continued)

*Primary Examiner* — Alexander Garlen
(74) *Attorney, Agent, or Firm* — Quinn IP Law

(57) ABSTRACT

A lighting assembly for use with a vehicle body has outboard and inboard ends with respect to the vehicle body, as well as a housing connectable to the vehicle body. Additionally, a light fixture is positioned proximate the outboard end and has a plurality of light sources. An elongated light transfer optical system connects to the light fixture, has a distal end proximate the inboard end, and is configured to direct light from one or more of the light sources from the outboard end to the distal end such that some of the directed light is emitted through the distal end of the light transfer optical system. An outer lens is connected to the housing such that the light fixture and the light transfer optical system are encapsulated by the connected housing and outer lens. A vehicle includes the vehicle body and the lighting assembly, e.g., a front headlight assembly.

18 Claims, 3 Drawing Sheets

(56) References Cited

U.S. PATENT DOCUMENTS

| | | | |
|---|---|---|---|
| 2013/0215633 A1* | 8/2013 | Wuerthele | B60Q 1/0047 362/516 |
| 2015/0078025 A1* | 3/2015 | Kleiner | F21S 41/24 362/511 |
| 2016/0146441 A1* | 5/2016 | Mochizuki | B60Q 1/0041 315/77 |
| 2016/0356446 A1* | 12/2016 | Okada | F21S 48/2237 |
| 2016/0369967 A1* | 12/2016 | Nakada | B60Q 1/2607 |

\* cited by examiner

VEHICLE LIGHTING ASSEMBLY WITH
LIGHT TRANSFER OPTICAL SYSTEM

INTRODUCTION

Vehicle lighting assemblies are configured to perform one or more designated lighting functions. For example, in addition to high-beam and low-beam headlight functions, a typical headlight assembly also houses daytime running light and turn signal functions. External vehicle lighting is typically required to conform to certain visibility standards, e.g., the front turn signal lights must be visible to a pedestrian within a particular horizontal and vertical angular range of the lighting assembly. As a result, structural design possibilities for vehicle headlight assemblies may be limited.

SUMMARY

A lighting assembly is disclosed herein for use with a vehicle body. A vehicle is also disclosed that includes the vehicle body and the lighting assembly. The lighting assembly may include an elongated light transfer optical system, e.g., a rectangular acrylic tube with an internal light-directing optical prescription. The light transfer optical system is configured to direct incident light from a light source located at an outboard position of the vehicle/lighting assembly, with such reflection occurring toward an inboard position. More aggressive forward-sweeping or forward-wrapping configurations of the lighting assembly may be enabled as a result of incorporation of the light transfer optical system, such as but not limited to front headlight assemblies in which the directed light corresponds to light from a vehicle turn signal function.

The lighting assembly in an example embodiment is usable with a vehicle body having outboard and inboard ends, i.e., outboard/farther from and inboard/closer to a longitudinal axis of the vehicle body. A housing of the lighting assembly is connectable to the vehicle body. The lighting assembly also includes a light fixture, the light transfer optical system, and an outer lens. The light fixture is positioned proximate the outboard end, and has multiple light sources, for example a row of four light-emitting diodes having one side-fire and three back-fire reflectors. The light transfer optical system is connected to the light fixture, and is configured to direct light from the light sources to the inboard end. The outer lens is connected to the housing such that the light fixture and elongated light transfer optical system are encapsulated by the connected housing and the outer lens.

A distal end of the light transfer optical system is positioned adjacent to a distal end of the outer lens. One or both of the distal ends includes surface optics configured to distribute the directed light through the distal ends. The surface optics may be a predetermined light-scattering pattern that is molded into, applied onto, or defined by the light transfer optical system.

In a non-limiting example embodiment, a surface normal vector of the distal end of the light transfer optical system is arranged within about 30-60 degrees of a surface normal vector of the distal end of the outer lens. Alternatively, when the lighting assembly is viewed in profile with respect to the horizontal, the distal end of the light transfer optical system may be normally/orthogonally arranged with respect to the horizontal, and the distal end of the outer lens may be about 45 degrees to the horizontal.

The light sources may optionally include a set of light-emitting diodes. In an example embodiment, four light-emitting diodes are aligned in a row, with three inboard LEDs and one outboard LED. The three inboard LEDs may include a corresponding back-fire reflector and the outboard light-emitting diode may include a side-fire reflector.

A distance between an outer surface of the outer lens and the housing at the inboard end of the lighting assembly may be at least 5 centimeters in some embodiments, such that the outer lens stands out or projects away from the vehicle body at the inboard end. In this manner, a predetermined surface area of the outer lens is ultimately illuminated at the inboard end of the lighting assembly.

In various embodiments, the light transfer optical system is connected to some or all of the light sources, including to one of the light sources in one embodiment and to all of the light sources in another embodiment.

The light transfer optical system may be embodied as a tube that is constructed, for instance, of acrylic or another suitable material. The tube has inner surfaces providing a predetermined optical prescription, such as a series of surface gratings or another surface feature configured to direct the light along the length of the light transfer optical system.

A vehicle according to a possible configuration includes a vehicle body and the lighting assembly, the latter of which is connected to a front end of the vehicle body and has outboard and inboard ends. In this particular embodiment, the lighting assembly includes a housing connected to the vehicle body, and also a light fixture configured to provide a turn signal lighting function aboard the vehicle. An elongated, tubular light transfer optical system is connected to the light fixture, has a distal end proximate the inboard end, and is configured to direct light from one or more light sources of the light fixture from the outboard end to the distal end, such that at least some of the directed light is emitted through the distal end of the light transfer optical system. The light fixture and light transfer optical system are encapsulated by the housing and outer lens. The outer lens projects outward from the vehicle body at the inboard end, and thus is not flush with the vehicle body.

The above features and advantages and other features and advantages of the present disclosure are readily apparent from the following detailed description of the best modes for carrying out the disclosure when taken in connection with the accompanying drawings. The foregoing summary describes some of the novel concepts and features set forth herein. Moreover, the disclosure expressly includes combinations and sub-combinations of the various elements and features presented herein.

Figure 1:
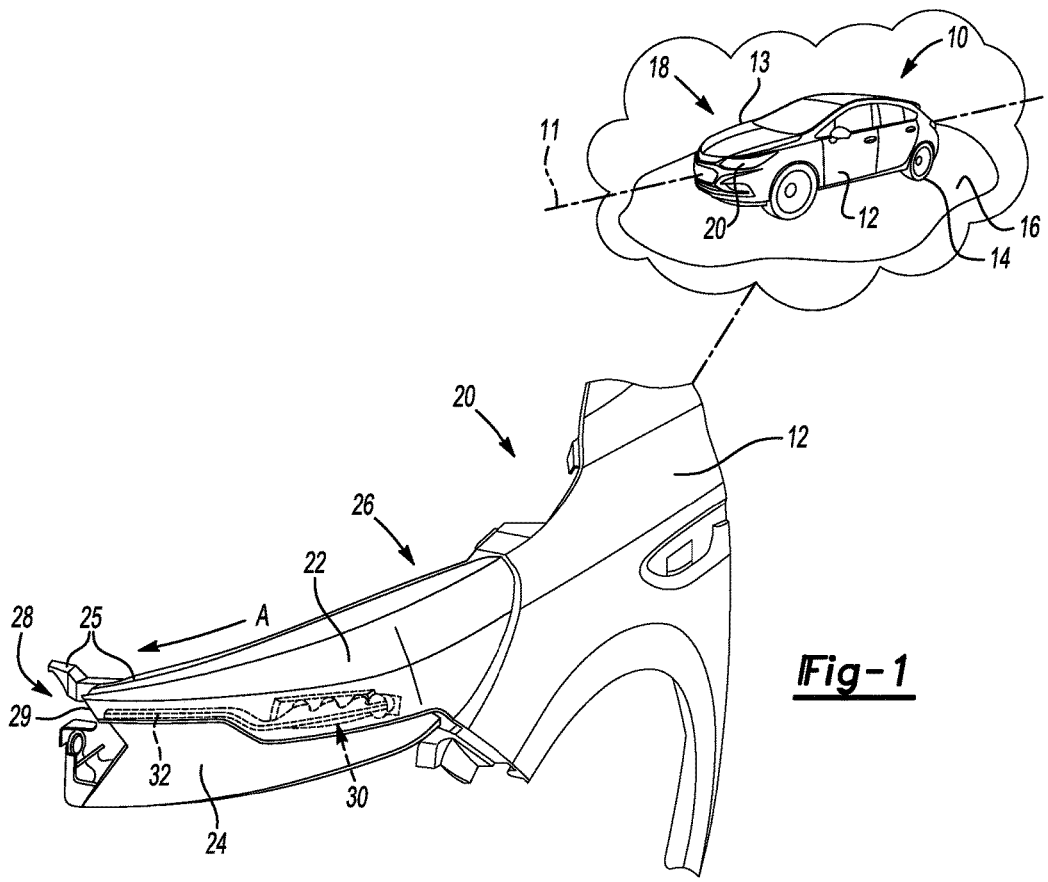
FIG. 1 is a schematic perspective side view illustration of an example vehicle and lighting assembly as described herein.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is intended to cover modifications, equivalents, combinations, sub-combinations, and alternatives falling within the scope of the disclosure as defined by the appended claims.

DETAILED DESCRIPTION

Referring to the Figures, wherein like numerals indicate like parts throughout the several views, an example vehicle 10 is shown in FIG. 1 having a vehicle body 12 and a hood 13, with the vehicle body 12 having a longitudinal centerline/axis 11. The vehicle 10 includes wheels 14 in rolling contact with a road surface 16, and further includes a lighting assembly 20 configured to direct light from an outboard end 26 to an inboard end 28 of the lighting assembly 20. As used herein, the term "outboard' refers to a lateral or side position with respect to the normal forward-driving configuration of the vehicle 10, while "inboard" refers to a position radially inward from the outboard position, i.e., closer to the longitudinal axis 11 of the vehicle 10.

The lighting assembly 20 has an outer lens 22 and a housing 25, the latter of which is connected to the vehicle body 12. In some embodiments, the outer lens 22 may be constructed of clear or transparent acrylic material and the housing 25 may be constructed of an opaque injection-molded plastic, although different materials may be used in other embodiments. The lighting assembly 20 is securely mounted to a fascia piece 24 of the vehicle body 12 adjacent to the hood 13 in an example headlight application. Although omitted from FIG. 1 for illustrative simplicity, the fascia piece 24 may be covered by another fascia piece, grill work, or other structure subsequent to installation of the lighting assembly 20 to provide a finished cosmetic appearance at a front end 18 of the vehicle 10.

The vehicle 10 is an example application of the lighting assembly 20, in which the lighting assembly 20 is positioned proximate the front end 18 and configured as a front headlight assembly. However, the lighting assembly 20 is not necessarily limited to motor vehicle applications in general or vehicular applications in particular. Other mobile platforms requiring improved lateral visibility of particular lighting effects, e.g., a front turn signal sequence, may benefit from use of the lighting assembly 20 when properly scaled and configured for the particular application.

Figure 2:
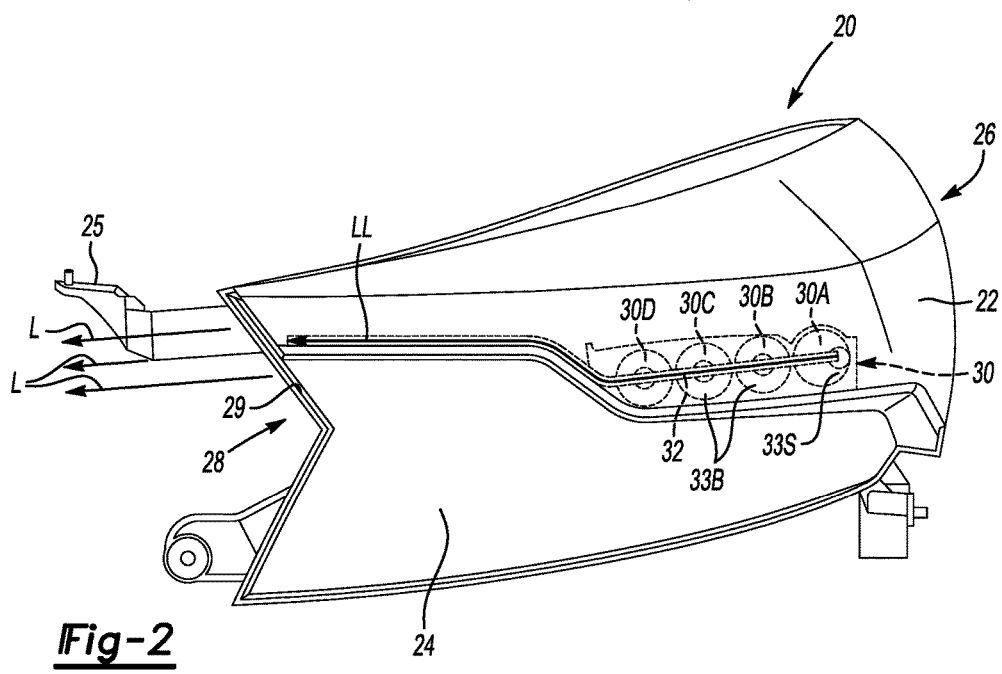
FIG. 2 is a schematic perspective view illustration of the lighting assembly shown in FIG. 1.

In keeping with the example front headlight/turn signal configuration of FIG. 1, in addition to containing low-beam and high-beam lighting functions (not shown), the lighting assembly 20 may also include a lighting fixture 30 having a plurality of light sources 30A, 30B, 30C, and 30D as best shown in FIG. 2, and an elongated light transfer optical system 32 as set forth in detail below with reference to FIGS. 2-5C. The light transfer optical system 32 is configured to direct, i.e., internally reflect and guide, emitted light from the lighting fixture 30, such as an alternating or blinking light pattern performing the front turn signal function. The light is fed into the light transfer optical system 32 from the outboard end 26 of the lighting assembly 20 toward and to the inboard end 28, the latter being located in proximity to the front end 18.

Light that is guided by the light transfer optical system 32 is ultimately directed through a substantially flat/planar distal end surface 29 of the outer lens 22, with the distal end surface 29 configured in such a way that emitted light (arrows L of FIG. 2) is readily visible to a human observer positioned proximate the front end 18 and laterally positioned with respect thereto. By way of example, a front turn signal function may be made visible within a calibrated angular range of a reference position, e.g., ±45° of a vertical plane intersecting the front end 18 of the vehicle 10, as seen from a lateral position with respect to the front end 18 of the vehicle 10 (i.e., a side viewing angle in proximity to the front end 18). Visibility may be required within ±15° of a horizontal plane intersecting the lighting assembly 20 from the same viewing position (i.e., up/down viewing angle when viewing the vehicle 10 proximate a side of the front end 18). The ranges/values of the visibility standards may vary from country to country, and thus modifications to the configuration described herein may be made within the scope of the disclosure so as to meet such standards.

In an illustrative scenario, when the vehicle 10 is preparing to execute a right-hand turn, a pedestrian may be positioned on a sidewalk opposite the direction of the turn, i.e., on the left-hand side of an operator of the vehicle 10. The pedestrian must be able to observe the turn signal within the above-noted angular range. Since the position of the pedestrian is on the opposite side of the vehicle 10 as the light fixture 30, for aggressively forward-sweeping/wrapping variations of the lighting assembly 20 and its outer lens 22, with the direction of forward sweep indicated by arrow A in FIG. 1, the turn signal lighting may not be fully visible to the pedestrian within the stated angular range. However, such styling is made possible using the light transfer optical system 32 to direct some of the turn signal lighting to and through the exposed distal end surface 29.

FIG. 2 depicts the lighting assembly 20 of FIG. 1 with additional internal detail. The light sources 30A-D may be individually controlled in a sequence to provide a predetermined flash rate. Therefore, although omitted for clarity from the Figures, the vehicle 10 may include an electronic control unit that receives a signaling request, e.g., in response to an operator controlled or an autonomously controlled activation, and in response to the signaling request, operates switches or other hardware to connect the individual light sources 30A-D to a battery or other power supply. The light sources 30A-D may be embodied as light-emitting diodes (LEDs), e.g., four LEDs aligned side-by-side in a row as shown. When the light sources 30A, 30B, 30C, and/or 30D are individually activated via a corresponding switching function, emitted light is fed into the light transfer optical system 32 and directed/guided along the length of the light transfer optical system 32 toward the inboard end 28, as indicated by arrow LL.

The light transfer optical system 32 may be embodied as a continuous rectangular or circular tube of acrylic or other suitable material, with its inner surfaces 37 (see FIG. 4) integrally formed or treated with an application-specific optical prescription, e.g., a textured lens pattern or a surface coating sufficient for reflecting, guiding, or otherwise directing the light along the entire length of the light transfer optical system 32. The guided light (arrow LL) ultimately exits the light transfer optical system 32 at inboard end 28, with the emitted light indicated in FIG. 2 as arrows L.

In another illustrative embodiment, each light source 30A-D may have a corresponding back-fire reflector 33B or side-fire reflector 33S, i.e., a polished parabolic reflector can be oriented in a direction that is substantially parallel to the longitudinal axis 11 of the vehicle 10 shown in FIG. 1 (back-fire) or angled with respect to the axis 11 (side-fire). The outboard-most light source, i.e., light source 30A, may include a corresponding side-fire reflector 33S, while the three inboard light sources 30B-D may include the back-fire reflector 33B in an example embodiment.

Figure 3:
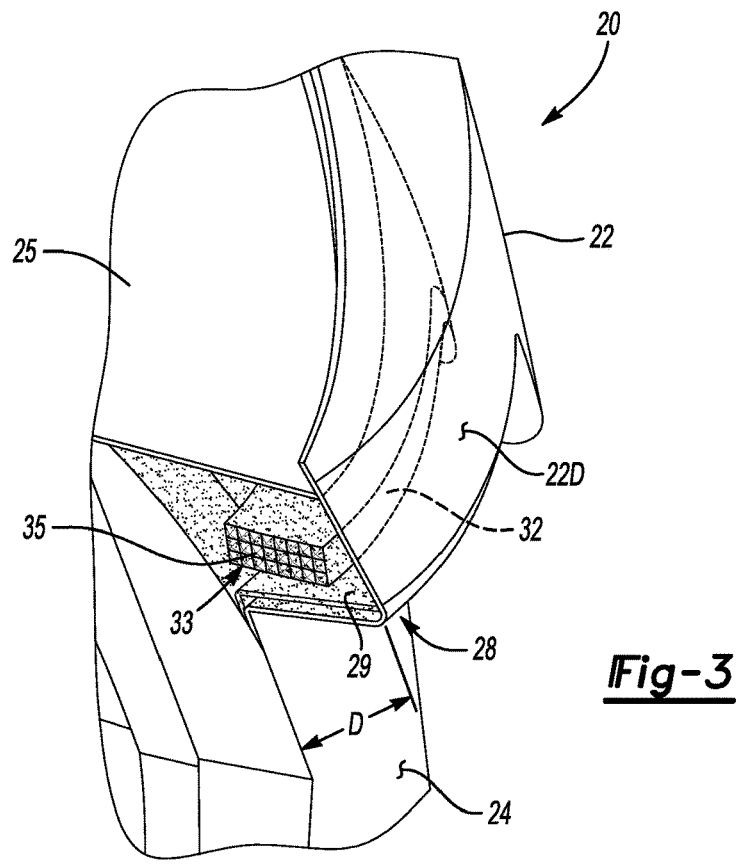
FIG. 3 is a perspective view illustration of an end portion of the lighting assembly shown in FIG. 2.

As best shown in FIG. 3, the lighting assembly 20 is configured such that a predetermined standoff distance (D) is provided between an outer surface 220 of the outer lens 22 and the fascia piece 24 at the distal end, with the distance (D) being large enough to provide the distal end surface 29 with the requisite surface area and, as a result, optimal lateral visibility per application-specific lighting standards. For example, the distance (D) may be at least 5 centimeters at the inboard end 28 in some embodiments, with other possible distances (D) being sufficient for ensuring that the outer lens 22 stands out from/is not flush with the housing 25 or fascia piece 24 at the inboard end 28.

Also shown in FIG. 3 is the distal end 33 of the light transfer optical system 32. The perspective of FIG. 3 is the profile that would be visible to an observer in the above-described scenario, that is, with the lighting assembly 20 being a front left/driver-side headlight and an observer positioned to the side of the front left/passenger side of the vehicle 10. In this scenario, the distal end surface 29 is exposed to the observer rather than tapering toward the vehicle body 12. The distal end surface 29 and the distal end of the light transfer optical system 32 may include surface optics 35. The surface optics 35 provide another optical prescription, and may be in the form of a predetermined surface pattern defined by the light transfer optical system 32 and/or the outer lens 22, with the surface pattern directing the light toward the above-noted observer.

Figure 4:
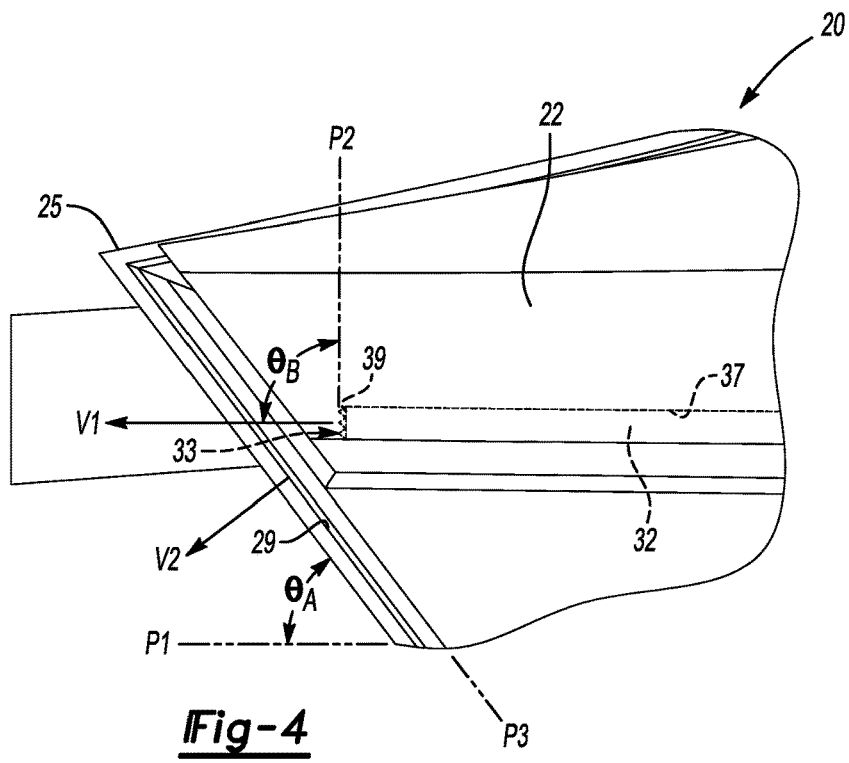
FIG. 4 is a perspective side view illustration of the lighting assembly of FIGS. 1-3 depicting a possible angular arrangement of a light guiding member and an outer lens of the headlight assembly.

FIG. 4 depicts the lighting assembly 20 of FIGS. 1-3 from a side view perspective, i.e., from the perspective of the front left/driver-side corner of the vehicle 10 of FIG. 1. As noted above, the light transfer optical system 32 may be embodied as an elongated tube, which may be of rectangular cross-section or other suitable geometries. The light transfer optical system 32 has inner surfaces 37 providing a suitable optical prescription, e.g., surface gratings, lens features, or another light distributing pattern. A surface normal vector V1 extending from a distal end surface 39 of the light transfer optical system 32 may be disposed within a range of between 30-60 degrees of a surface normal vector V2 of the distal end surface 29 of the outer lens 22. Or, with respect to a horizontal plane P1 along the longitudinal axis of the vehicle 10, a plane P2 of the distal end surface 39 may be orthogonally arranged/90° (θB) and a plane P3 of the distal end surface 29 may be arranged at an angle of about 45° (θA) to the horizontal. Other relative arrangements may be used within the scope of the disclosure to provide the desired lighting effect at the exposed distal end surface 29.

Figure 5A:
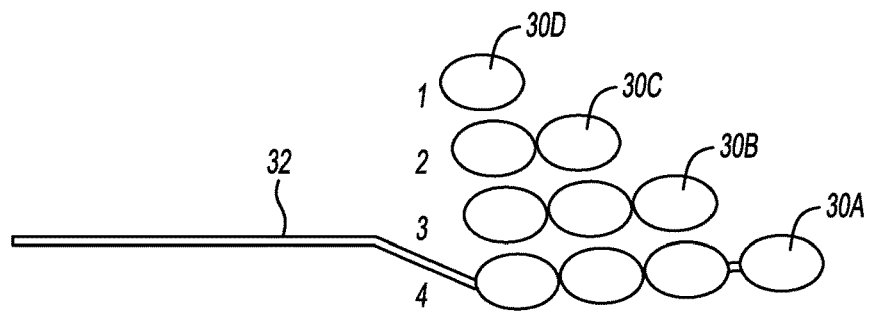
FIGS. 5A-C are schematic illustrations of three possible lighting sequences that may be used in the control of the headlight assembly of FIGS. 1-4.
Figure 5B:
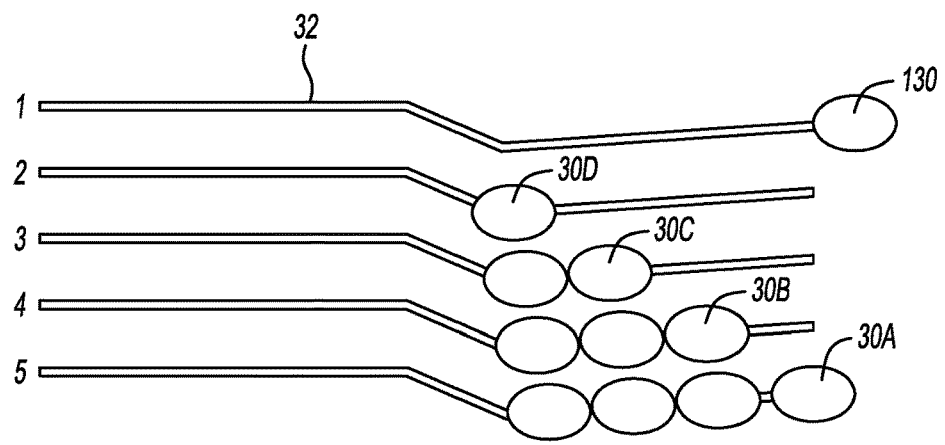
Figure 5C:
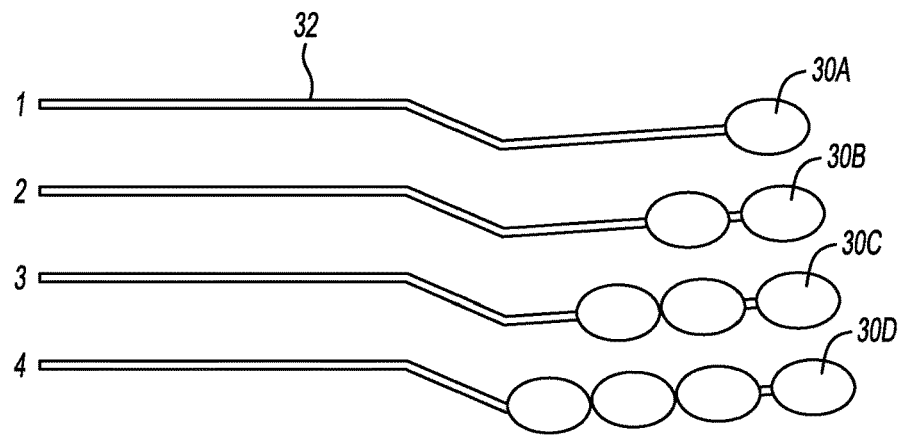

FIGS. 5A-C depict three possible example lighting sequences for the disclosed lighting assembly 20 of FIGS. 1-4, or more precisely for the illumination of the light sources 30A-D and the light transfer optical system 32 connected thereto. In FIG. 5A, the elongated light transfer optical system 32 is connected to only one of the light sources, e.g., the light source 30A. Thus, light may be directed through the light transfer optical system 32 in this embodiment only when the light source 30A is energized. For instance, when executing a left turn signaling maneuver aboard the vehicle 10 of FIG. 1, a light sequence may be 1, 2, 3, 4 as numbered in FIG. 5A, i.e., illumination of light sources 30D, 30C, 30B, and 30A in that particular sequence.

Once the light source 30A is illuminated, light is directed along the length of and through the light transfer optical system 32 as noted above.

In FIGS. 5B and 5C, the light transfer optical system 32 is connected to all of the light sources 30A-D, and thus light is directed via the light transfer optical system 32 to the distal end surface 29 as soon as the same turn signaling maneuver is started. That is, light is directed along the light transfer optical system 32 to the distal end surface 29, thereby illuminating the distal end surface 29 of FIG. 3 regardless of how many of the light sources 30A-30D are energized. FIG. 5B provides the added option of illuminating the light transfer optical system 32 via a separate light source 130, e.g., another LED, incandescent, or halogen bulb, when none of the light sources 30A-D are energized.

Using the lighting assembly 20 described above, supplemental lighting may be optically distributed for improved visibility, thereby enabling more aggressive, forward-sweeping styling. Such styling can also improve aerodynamic performance of the lighting assembly. The ability to control the sequence of light activation within existing flash rate requirements, coupled with the enabled forward-sweeping styling, also allows for turn signaling with a more dynamic wrap-around or forward-sweeping appearance. These and other possible advantages will be appreciated by those of ordinary skill in the art in view of the forgoing disclosure.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A lighting assembly for use with a vehicle body, having outboard and inboard ends with respect to the vehicle body, and comprising:
   a housing connectable to the vehicle body;
   a light fixture positioned proximate the outboard end and having a plurality of light sources;
   an elongated light transfer optical system connected to the light fixture, having a distal end proximate the inboard end, and configured to direct light from one or more of the light sources from the outboard end of the lighting assembly to the inboard end of the lighting assembly, such that some of the directed light is emitted through the distal end of the light transfer optical system; and
   an outer lens connected to the housing such that the light fixture and the light transfer optical system are encapsulated by the connected housing and the outer lens, wherein the distal end of the light transfer optical system is positioned adjacent to a distal end surface of the outer lens, and includes a surface optical prescription configured to distribute the directed light over a length of the light directing element and through the distal end surface of the outer lens.

2. The lighting assembly of claim 1, wherein the surface optical prescription is defined by the light transfer optical system.

3. The lighting assembly of claim 1, wherein a surface normal vector of the distal end of the light transfer optical system is disposed within a range of 30-60 degrees of a surface normal vector of the distal end of the outer lens.

4. The lighting assembly of claim 1, wherein the plurality of light sources includes a plurality of light-emitting diodes.

5. The lighting assembly of claim 4, wherein the plurality of light-emitting diodes includes a row of four light-emitting diodes.

6. The lighting assembly of claim 1, wherein a distance between an outer surface of the outer lens and the housing is at least 5 centimeters at the inboard end, such that the outer lens is not flush with the vehicle body at the inboard end.

7. The lighting assembly of claim 1, wherein the light transfer optical system is connected to only one respective light source of the plurality of light sources.

8. The lighting assembly of claim 1, wherein the light transfer optical system is connected to all respective light sources of the plurality of light sources.

9. The lighting assembly of claim 1, wherein the light transfer optical system is a tube constructed of an acrylic material and has inner surfaces treated with an optical dispersion pattern sufficient for directing the light along an axis of the light transfer optical system.

10. A vehicle comprising:
    a vehicle body; and
    a lighting assembly connected to a front end of the vehicle body, and having outboard and inboard ends with respect to the vehicle body, the lighting assembly including:
        a housing connected to the vehicle body;
        a light fixture configured to provide a turn signal lighting function aboard the vehicle, wherein the light fixture is positioned proximate the outboard end and has a plurality of light sources;
        an elongated tubular light transfer optical system connected to the light fixture, having a distal end proximate the inboard end, and configured to direct light from one or more of the light sources from the outboard end to the distal end such that some of the directed light is emitted through the distal end of the light transfer optical system; and
        an outer lens connected to the housing such that the light fixture and the light transfer optical system are encapsulated by the connected housing and outer lens;
    wherein the outer lens projects outward from and is not flush with the vehicle body at the inboard end, wherein the distal end of the light transfer optical system is positioned adjacent to a distal end surface of the outer lens, and includes surface optics configured to distribute the directed light through the distal end surface of the outer lens.

11. The vehicle of claim 10, wherein the plurality of light sources includes a row of light-emitting diodes.

12. The vehicle of claim 11, wherein the row of light-emitting diodes includes four light-emitting diodes, and wherein one of the four light-emitting diodes has a side-fire reflector and three of the four light-emitting diodes have a back-fire reflector.

13. The vehicle of claim 10, wherein the surface optics are a predetermined pattern defined by the light transfer optical system.

14. The vehicle of claim 10, wherein a surface normal vector of the distal end of the light transfer optical system is disposed within a range of 30-60 degrees of a surface normal vector of the distal end of the outer lens.

15. The vehicle of claim 10, wherein a distance between an outer surface of the outer lens and the housing is at least 5 centimeters at the inboard end.

16. The vehicle of claim 10, wherein the light transfer optical system is connected to only one respective light source of the plurality of light sources.

17. The vehicle of claim 10, wherein the light transfer optical system is connected to all respective light sources of the plurality of light sources.

18. The vehicle of claim 10, wherein the light transfer optical system is constructed of an acrylic material and has inner surfaces that include an optical dispersion pattern sufficient for directing the light along a length of the light transfer optical system.

* * * * *